(12) United States Patent
Curran et al.

(10) Patent No.: US 9,832,649 B1
(45) Date of Patent: Nov. 28, 2017

(54) SECURE ID AUTHENTICATION

(71) Applicant: TECHNOLOGY BUSINESS MANAGEMENT, LIMTED, Manchester (GB)

(72) Inventors: Keith Curran, Prestbury (GB); Tarlok Nath Teji, Harrogate (GB)

(73) Assignee: TECHNOLOGY BUSINESS MANAGEMENT, LIMTED, Manchester (GB)

(*) Notice: Subject to any disclaimer, the term of this patent is extended or adjusted under 35 U.S.C. 154(b) by 0 days.

(21) Appl. No.: 14/238,780

(22) Filed: Feb. 13, 2014

Related U.S. Application Data

(63) Continuation-in-part of application No. PCT/GB2012/000775, filed on Oct. 11, 2012.

(30) Foreign Application Priority Data

Oct. 12, 2011 (GB) .................................. 1117640.1
Oct. 4, 2013 (GB) .................................. 1317575.7

(51) Int. Cl.
*H04W 12/08* (2009.01)
*H04W 12/06* (2009.01)
*G06F 21/42* (2013.01)

(52) U.S. Cl.
CPC ............. *H04W 12/08* (2013.01); *G06F 21/42* (2013.01); *H04W 12/06* (2013.01)

(58) Field of Classification Search
CPC ........ G06F 21/42; H04W 12/06; H04W 12/08
See application file for complete search history.

(56) References Cited

U.S. PATENT DOCUMENTS 4,567,600 A  1/1986 Massey et al.
5,483,165 A  1/1996 Cameron et al.
(Continued)

FOREIGN PATENT DOCUMENTS

CN  1897027    1/2007
EP  2106 191   9/2009
(Continued)

OTHER PUBLICATIONS

International Search Report dated Jan. 27, 2015. International Application No. PCT/GB2014/052998, Filing Date: Oct. 3, 2014.
(Continued)

*Primary Examiner* — Beemnet Dada
*Assistant Examiner* — Stephen Gundry
(74) *Attorney, Agent, or Firm* — Dority & Manning, PA

(57) ABSTRACT

A secure ID authentication system for authenticating over a multi-channel cellular radio network a response from a user module comprising a SIM card to a request from an application programming interface (API) to authenticate a transaction, in which;
  a request is sent to an identity application server (IAS) holding a database of user module ID information;
  the IAS transmits the request over a first channel of the cellular network as a class 2 SMS message to the SIM card;
  the SIM card causes the request to be displayed on the user module;
  when a response is entered, the user module encrypts the response and associated data and transmits the encrypted data over a second channel of the cellular network to an over-the-air (OTA) gateway to the IAS; and
  the IAS decrypts the data and transmits the response to the API.

10 Claims, 1 Drawing Sheet

(56) References Cited

U.S. PATENT DOCUMENTS

| | | | |
|---|---|---|---|
| 5,818,937 A | 10/1998 | Watson | |
| 5,999,811 A * | 12/1999 | Molne | H04W 48/16 |
| | | | 379/357.01 |
| 6,278,885 B1 * | 8/2001 | Hubbe et al. | 455/558 |
| 6,789,078 B2 | 9/2004 | Saitou et al. | |
| 6,847,816 B1 * | 1/2005 | Sarradin | G06Q 20/04 |
| | | | 235/380 |
| 7,167,843 B2 | 1/2007 | de Jong | |
| 7,555,288 B2 | 6/2009 | Bowen | |
| 7,634,280 B2 | 12/2009 | Modeo | |
| 8,073,810 B2 * | 12/2011 | Maes | G06F 17/30575 |
| | | | 707/600 |
| 8,346,929 B1 * | 1/2013 | Lai | 709/226 |
| 8,868,757 B1 * | 10/2014 | Liu | H04L 63/0281 |
| | | | 709/220 |
| 9,317,843 B2 * | 4/2016 | Bradley | G06Q 20/1235 |
| 9,565,297 B2 * | 2/2017 | Maes | H04L 63/102 |
| 2002/0087543 A1 * | 7/2002 | Saitou | G06Q 20/4012 |
| 2003/0069792 A1 | 4/2003 | Blumenthal | |
| 2003/0120593 A1 * | 6/2003 | Bansal et al. | 705/39 |
| 2003/0130957 A1 * | 7/2003 | Best et al. | 705/72 |
| 2003/0172272 A1 * | 9/2003 | Ehlers et al. | 713/170 |
| 2003/0229597 A1 | 12/2003 | de Jong | |
| 2004/0019564 A1 * | 1/2004 | Goldthwaite | G06Q 20/04 |
| | | | 705/44 |
| 2005/0002533 A1 | 1/2005 | Langin-Hooper et al. | |
| 2005/0144457 A1 * | 6/2005 | Lee et al. | 713/176 |
| 2005/0177517 A1 * | 8/2005 | Leung | G06Q 20/20 |
| | | | 705/64 |
| 2006/0006226 A1 * | 1/2006 | Fitzgerald et al. | 235/380 |
| 2006/0123479 A1 * | 6/2006 | Kumar et al. | 726/23 |
| 2006/0183489 A1 | 8/2006 | Modeo | |
| 2007/0124818 A1 * | 5/2007 | Bumiller | H04L 63/123 |
| | | | 726/26 |
| 2007/0255845 A1 | 11/2007 | Bowen | |
| 2007/0297614 A1 | 12/2007 | Rubin | |
| 2009/0150248 A1 | 6/2009 | Ling et al. | |
| 2009/0325615 A1 * | 12/2009 | McKay | H04L 63/02 |
| | | | 455/466 |
| 2010/0250442 A1 | 9/2010 | Coppinger | |
| 2011/0131638 A1 * | 6/2011 | Kan | 726/6 |
| 2012/0174144 A1 * | 7/2012 | Flores Xavier et al. | 725/14 |
| 2012/0203880 A1 * | 8/2012 | Kluyt | G06F 9/54 |
| | | | 709/223 |
| 2012/0316961 A1 * | 12/2012 | Evans | H03M 7/00 |
| | | | 705/14.53 |
| 2013/0073365 A1 * | 3/2013 | McCarthy | G06Q 20/02 |
| | | | 705/14.23 |
| 2013/0073463 A1 * | 3/2013 | Dimmick | G06Q 20/40 |
| | | | 705/44 |
| 2013/0104246 A1 * | 4/2013 | Bear | H04L 63/10 |
| | | | 726/28 |
| 2013/0138428 A1 * | 5/2013 | Chandramouli | G06F 17/274 |
| | | | 704/9 |
| 2013/0166450 A1 | 6/2013 | Pama | |
| 2013/0248596 A1 | 9/2013 | Arora et al. | |
| 2013/0260739 A1 * | 10/2013 | Saino | G06F 9/547 |
| | | | 455/419 |
| 2013/0291060 A1 * | 10/2013 | Moore | G06F 21/6245 |
| | | | 726/1 |
| 2013/0328661 A1 * | 12/2013 | Phillips | G06K 9/00771 |
| | | | 340/5.7 |
| 2014/0294180 A1 * | 10/2014 | Link, II | G08G 1/205 |
| | | | 380/270 |
| 2014/0372319 A1 * | 12/2014 | Wolovitz | G06Q 30/06 |
| | | | 705/71 |
| 2015/0106456 A1 * | 4/2015 | van Hoek | H04W 4/12 |
| | | | 709/206 |
| 2015/0201313 A1 * | 7/2015 | Celik | H04M 1/72583 |
| | | | 455/414.1 |
| 2015/0365420 A1 * | 12/2015 | Kochhar | H04L 63/0838 |
| | | | 726/6 |
| 2015/0365827 A1 * | 12/2015 | Badenhorst | H04L 63/0876 |
| | | | 455/411 |
| 2016/0004820 A1 * | 1/2016 | Moore | G06F 19/321 |
| | | | 705/3 |
| 2016/0048812 A1 * | 2/2016 | Collins | G06F 21/10 |
| | | | 705/26.1 |
| 2017/0132594 A1 * | 5/2017 | Morgan | G06Q 20/12 |
| 2017/0163645 A1 * | 6/2017 | Bradley | H04L 63/10 |

FOREIGN PATENT DOCUMENTS

| | | | | |
|---|---|---|---|---|
| GB | 2481587 A | | 1/2012 | |
| GB | 2499360 A | | 8/2013 | |
| MY | WO 2010140876 A1 * | | 12/2010 | G06Q 20/12 |
| WO | WO 01/24129 | | 4/2001 | |
| WO | WO 01/59731 A1 | | 8/2001 | |
| WO | WO 01/80525 | | 10/2001 | |
| WO | WO 2006/030281 A2 | | 3/2006 | |
| WO | WO 2006/030281 A3 | | 3/2006 | |
| WO | WO 2006/128215 | | 12/2006 | |
| WO | WO 2008/089383 A2 | | 7/2008 | |
| WO | WO 2008/089383 A3 | | 7/2008 | |
| WO | WO 2009/136848 A1 | | 11/2009 | |
| WO | WO 2010/073199 A1 | | 7/2010 | |
| WO | WO 2010/140876 A1 | | 12/2010 | |
| WO | WO 2011/133988 A3 | | 10/2011 | |
| WO | WO 2011133988 A2 * | | 10/2011 | |
| WO | WO 2012/004640 A1 | | 1/2012 | |
| WO | WO 2012004395 | | 1/2012 | |
| WO | WO 2013/054073 A1 | | 4/2013 | |

OTHER PUBLICATIONS

Secure USSD Facility for Financial Institutions/Analysis and Recommendation Report. Dated: 2003-2010, (12 Pages).

"Unstructured Supplementary Service Data," http://en.wikipedia.org/wiki/Unstructured_Supplementary_Service_Data, Wikipedia, Mar. 8, 2014.

Aujas.com, "Mitigating Security Risks in USSD-Based Mobile Payment Applications" [online], 2011, Available from: http:blog.aujas.com/2011/05/31/mitigating-security-risks-in-ussd-based-mobile-payment-applications/ Whole document relevant.

Mobile Payment Forum, India, "Analysis of Mobile Infrastructure for Secure Mobile Payments" [online], 2008, available from: www.mpf.org.in/doc/Mobile%20Payments%20Channels.doc See especially pp. 6 & 7, USSD Security and Conclusions section.

Abstract of Japanese Patent—JP2009516305, Apr. 16, 2009, 2 pages.

Abstract of Japanese Patent—JP2007094874, Apr. 12, 2007, 1 page.

* cited by examiner

2

SECURE ID AUTHENTICATION

PRIORITY STATEMENT

The present application is a Continuation in Part application, claiming priority under 35 U.S.C. §§120 and 365(c) to International Application number PCT/GB2012/000776, filed on Oct. 11, 2012, which claims priority to GB Application Number 1117641.9, filed on Oct. 12, 2011 in the United Kingdom Intellectual Property Office, and to GB Application Number 1317575/7, filed on Oct. 4, 2013 in the United Kingdom Intellectual Property Office.

FIELD OF THE INVENTION

This invention relates to secure ID authentication procedures, particularly, but not exclusively, for authenticating financial and other transactions over publicly accessible communications networks such as cellular telephone networks and the world wide web.

BACKGROUND OF THE INVENTION

An accepted authentication procedure for credit and debit card transactions involves the use of a PIN—a personal identification code, usually consisting of a four digit number, such as 7356—that is known, or supposed to be known, only to the card holder. Not even the issuing bank or card company knows the user's PIN.

A payment card PIN is held on the card as an element of data in a magnetic strip or an embedded microchip. At a payment terminal connected in a communications network, the terminal reads the PIN from the magnetic strip or microchip and requests the user to enter the PIN on a keypad. If they match, the transaction is authenticated. In this instance, there is no transmission of the PIN over the network. The module simply confirms that the payment is authorised.

Instead of a PIN, which is essentially known as a four digit number, a Passcode can be used, which may be alphanumeric and comprise more than four characters.

However, in many other transactions between a user and a service module, which do not use a dedicated payment terminal with a facility for checking an entered PIN or Passcode, the PIN or Passcode would need to be stored on the service module, and checked there in order to authenticate the transaction.

The PIN or Passcode is vulnerable, however, to discovery when transmitted over a publicly accessible network. Knowledge of the PIN or Passcode could enable unauthorised access to the holder's accounts and other restricted access information. It has been proposed to improve security by more complex procedures.

A common approach is to require a two-part identity check, one part being specific to the instrument used to transmit the information to the service module, the other part being specific to the user. If the instrument is a mobile phone, a combination of phone ID and user ID is required. The phone will have a unique ID, being, of course, the telephone number as it appears on the subscriber identity module (SIM) card. The industry mandates that there is only ever one SIM card with any particular number.

However, transmitting this information over a network is open to the risk of eavesdropping. It does not matter that the SIM card ID is unique—it is only required to record and re-use the data stream to access the service module.

Simply encrypting the information is no help. It would, in any event, be the encoded information that is intercepted. It is not necessary to de-encrypt it, just use it in the encrypted format, to gain access.

Resort is had, therefore, to a one-time password (OTP). Interception is now pointless, as the same data stream will not work a second time.

Examples of OTP systems are found in WO2010/101476, WO0131840, and numerous other patent publications.

However, OTP systems require software on the user module to generate them, and corresponding software on the service module to verify them, and, in order to provide acceptable levels of security, the software and its usage are sometimes made deliberately complex, in some instances requiring time-limited passwords and random number generators, or costly ancillary equipment.

The present invention provides simpler approaches to the problem of secure ID authentication.

SUMMARY OF THE INVENTION

The invention comprises a secure identification (ID) authentication system for authenticating, over a multi-channel network comprising at least three of: a land line channel, a voice and data channel of a cellular radio network, a UDDI (Universal Description Discovery and Integration) channel of the cellular radio network and a USSD (Unstructured Supplementary Service Data) channel of the cellular radio network, a response from a user module comprising a subscriber identity module (SIM) card to a request from an application programming interface (API) to authenticate a transaction, in which;

the request is sent to an identity application server OAS) holding a database of user module ID information;

the IAS transmits the request over the cellular radio network as a class 2 short message service (SMS) message to the SIM card;

the SIM card causes the request to be displayed on the user module;

when the response is entered, the user module encrypts the response and associated data and transmits the encrypted data over the cellular radio network to an over-the-air (OTA) gateway to the IAS; and the IAS decrypts the data and transmits the response to the API;

in which the class 2 SMS message and the encrypted data are each sent over different channels of the cellular radio network, at least one of the different channels selected from the group consisting of the UDDI channel and USSD channel networks.

The request may be sent to the IAS over a channel selected from the land line channel and the voice and data channel.

The response may be transmitted over the UDDI channel or the USSD channel.

The class 2 SMS message and the response may be transmitted over different channels.

The class 2 SMS message and the response may be both sent over a channel selected from the UDDI and USSD channels.

The first channel may comprise the normal channel of the cellular network over which voice and texts are carried.

The second channel may comprise a UDDI (Universal Description Discovery and Integration) network, which is an Extensible Markup Language network on which web service applications can be registered and located.

The second channel may comprise a USSD channel, which is a channel using a USSD (Unstructured Supplementary Service Data) protocol. Such a channel is used by cellular telephones to provide real time communication between user modules and the service provider's computers for sundry purposes, including updating credits balances on pay-as-you-go SIM cards. There is no store and forwarding functionality.

On the other hand, the second channel may be the normal voice and text channel, the first channel being the USSD or UDDI channel.

The use of separate channels or channels not normally used for such transactions for a single authentication procedure militates against eavesdropping inasmuch as it becomes difficult to match request and response. Both UDDI and USSD channels may be used, a request containing code specifying that the response should come over one or other of the channels, which puts further difficulty in the way of an eavesdropper, inasmuch as that code would have to be cracked simply to gain access to the response.

The user module may comprise a mobile phone, a tablet or a laptop, palmtop, netbook or other computer with cellular network connectivity. Services requiring authentication may comprise credit card payments, PayPal payments, request or order placement for goods or services, voting in elections or referendums and accessing Cloud data stores.

The system may involve a user PIN or Passcode request, and the system may then include a test server holding a database of encrypted user module ID and associated PIN or Passcode data. The OTA gateway then transmits the encrypted data to the test server, which, if it has a match for user module ID and PIN or Passcode data, transmits the data to the IAS, which decrypts it and forwards the response to the API as being PIN or Passcode authenticated.

BRIEF DESCRIPTION OF THE DRAWINGS

Embodiments of the system will now be described with reference to the accompanying drawing, in which.

DESCRIPTION OF THE INVENTION

Figure 1:
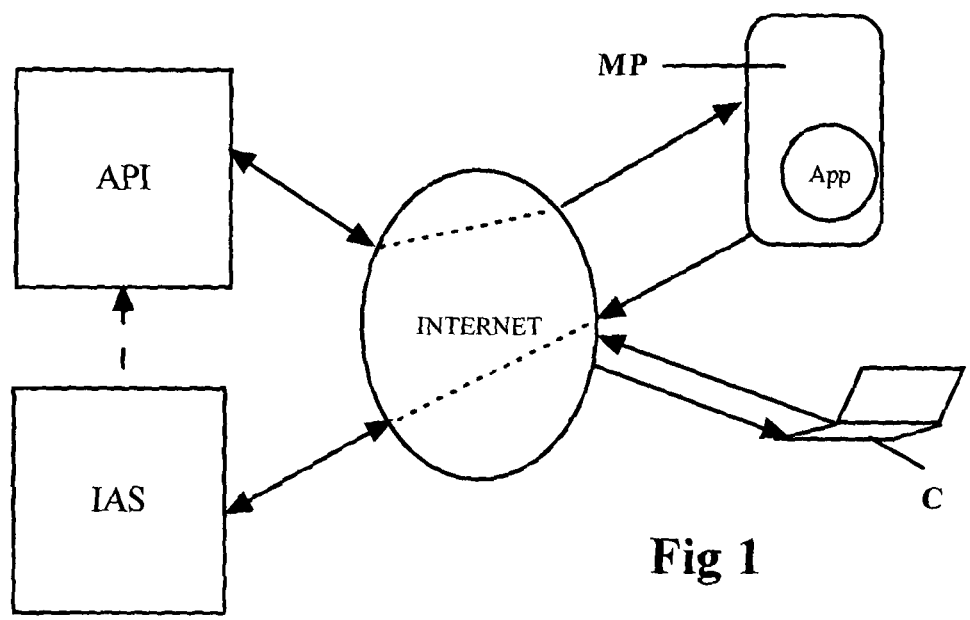
FIG. 1 is a block diagram.

The drawing illustrates a secure ID authentication system for authenticating over a multi-channel cellular radio network a response from a user module, such as a mobile phone MP, comprising a SIM card to a request from an application programming interface (API) to authenticate a transaction. The transaction may be one not requiring to be secured by a PIN, such as a subscription to a newsletter or one requiring a simple yes/no answer or a selection from a list of options, or one involving a payment or the provision of personal information, that needs a PIN entry. For PIN, of course, one may substitute Passcode.

Figure 2:
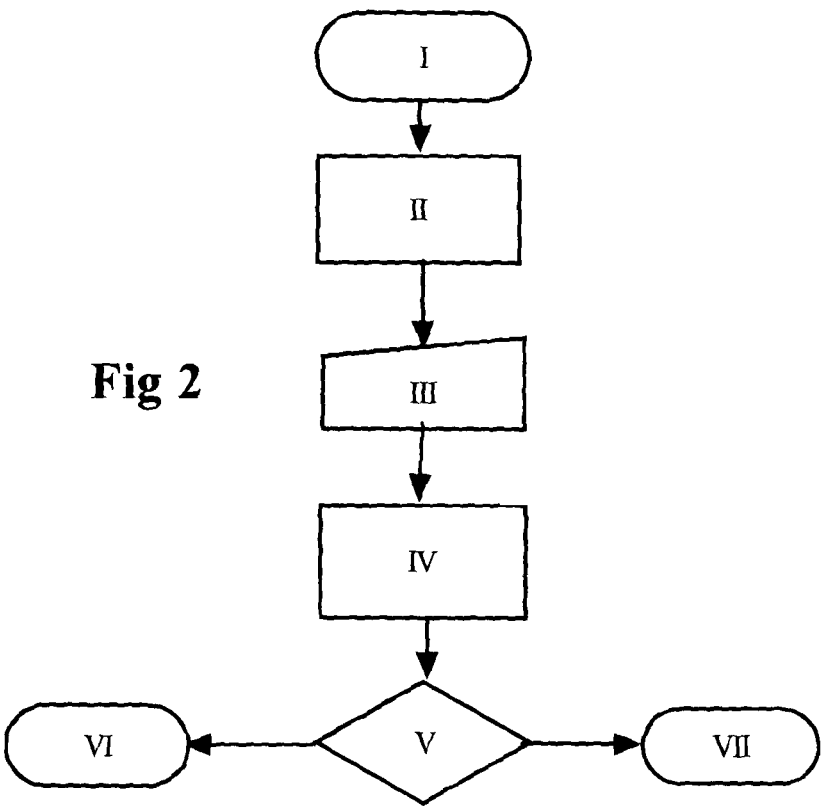
FIG. 2 is a flow chart.

The request is sent—Step I, FIG. 2—to an identity application server (IAS) holding a database of user module ID information. In FIG. 1, the request is shown being sent over a landline C1 but it could otherwise be sent over a voice and data channel C2 of a cellular radio network CN. The IAS converts the request—Step II—to a Class 2 short message service (SMS) message which it transmits—Step III—to the SIM card of the phone MP which displays the message on the phone VDU, with optional audio for visually impaired users, and requests an input. As shown in FIG. 1, the request is sent over channel C2, but it could also be sent over another channel C3 which is a UDDI channel or yet another channel C4 which is a USSD Channel of the network CN.

The user enters the information requested at Step IV. The information is encrypted and sent—Step V—over channel C3 or channel C4 of the cellular network CN to an OTA gateway, such as a 03.48 gateway. Encryption can be effected in any secure way, such as hash encryption. If the information contains a PIN—decision step VI—it is sent on to a PIN test server PTS, which contains a database of module ID information and associated PINs, where it is matched, Step VII, or not, with data stored in the database. If the module user ID and associated PIN are found on the PTS, the message is forwarded—Step VIII—to the IAS, or the procedure terminated—Step XI—perhaps with a "wrong PIN" message back, to the phone MP.

If the message does not contain a PIN, it is sent straight from the OTA gateway to the IAS. Messages that reach the IAS result—Step IX—in a "transaction approved" message sent back to the API and the procedure terminated at Step X.

Coding in the request may specify which channel should be used for the response, so that, with a request sent over the voice and text channel, the response is sent, unpredictably, without knowledge of the coding, over either of the other channels.

Hacking into any transaction requires access to one or other or both of the channels C3, C4, and to be able to tie up a response sent thereover with the initial authentication request, which is thwarted in any event by the response being encrypted, but which is a much more difficult thing to do than tie two messages together over a single channel. If, moreover, one of the channels is unpredictably a UDDI channel or a USSD channel, the task becomes gargantuan. In addition to facilitating secure financial transactions, including payments by credit or debit card or to and from bank accounts, the system can provide secure access to a personal database that might be kept in the API. The database might comprise a virtual vault that securely stores personal data such as birth certificate and passport details, purchase records, from which a personal profile might be built up which could be selectively available to retailers, who might thereby recommend products and services, an address book, clearly, and a CV, as well as driving licence and insurance details. An this could be securely accessed by, and added to or changed, from a mobile phone or like device.

The invention claimed is:

1. A secure identification (ID) authentication system for authenticating, over a multi-channel network comprising at least three of: a land line channel, a voice and data channel of a cellular radio network, a Universal Description Discovery and Integration (UDDI) channel of the cellular radio network and an Unstructured Supplementary Service Data (USSD) channel of the cellular radio network or SMS gateway channel, a response from a user module comprising a subscriber identity module (SIM) card to a request from an application programming interface (API) to authenticate a transaction, in which;

the request is sent to an identity application server (IAS) holding a database of user module ID information;

the IAS converts the request to a class 2 short message service (SMS) message and transmits the class 2 SMS message over a first channel of the cellular radio network to the SIM card;

the SIM card causes the request to be displayed on the user module;

when the response is entered, the user module encrypts the response and associated data and transmits the response and encrypted data over a second channel of the cellular radio network to the IAS via an over-the-air (OTA) gateway; and the IAS decrypts the data and transmits the response to the API;

in which the class 2 SMS message and the response and encrypted data are each sent over different channels of the cellular radio network, and wherein one of the first channel and the second channel is a UDDI channel.

2. The system according to claim 1, in which the request is sent to the IAS over a channel selected from the land line channel and the voice and data channel.

3. The system according to claim 1, in which the response and encrypted data is transmitted from the user module over the UDDI channel.

4. The system according to claim 1, in which the response and encrypted data is transmitted from the user module over the USSD channel.

5. The system according to claim 1, which includes a personal identification code (PIN) or Password test server holding a database of encrypted user module ID and associated PIN or Password data.

6. The system according to claim 5, in which the OTA gateway transmits the encrypted data to the PIN or Password test server, which, if it has a match for user module ID and PIN or Password data, transmits the encrypted data to the IAS, which decrypts it and forwards the response to the API as being PIN or Password authenticated.

7. The system according to claim 1, in which encryption is hash encryption.

8. The system according to claim 1, when used for authenticating financial transactions.

9. A system for the secure storage of data, such as personal data, comprising an access system comprising the secure ID authentication system according to claim 1.

10. The system according to claim 1, wherein coding in the request specifies which of the different channels is used to transmit the response and encrypted data.

* * * * *